United States Patent
Yoshiyama et al.

(10) Patent No.: US 10,664,752 B2
(45) Date of Patent: May 26, 2020

(54) INFORMATION PROCESSING METHOD AND INFORMATION PROCESSING APPARATUS

(71) Applicant: SONY CORPORATION, Tokyo (JP)

(72) Inventors: Kazuki Yoshiyama, Kanagawa (JP); Yoshiyuki Kobayashi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 119 days.

(21) Appl. No.: 15/774,850

(22) PCT Filed: Nov. 25, 2016

(86) PCT No.: PCT/JP2016/084964
§ 371 (c)(1),
(2) Date: May 9, 2018

(87) PCT Pub. No.: WO2017/141517
PCT Pub. Date: Aug. 24, 2017

(65) Prior Publication Data
US 2018/0330237 A1    Nov. 15, 2018

(30) Foreign Application Priority Data
Feb. 17, 2016    (JP) .................................. 2016-027923

(51) Int. Cl.
*G06N 3/10* (2006.01)
*G06N 3/08* (2006.01)
(Continued)

(52) U.S. Cl.
CPC ............. *G06N 3/08* (2013.01); *G06F 16/838* (2019.01); *G06N 3/0454* (2013.01); *G06N 3/10* (2013.01)

(58) Field of Classification Search
None
See application file for complete search history.

(56) References Cited

U.S. PATENT DOCUMENTS

2012/0158623 A1    6/2012    Bilenko et al.

FOREIGN PATENT DOCUMENTS

| JP | 2001-034599 A | 2/2001 |
| JP | 2002-042107 A | 2/2002 |

OTHER PUBLICATIONS

Jin, et al., Pareto-Based Multiobjective Machine Learning: An Overview and Case Studies, IEEE Transactions on Systems, Man, and Cybernetics—Part C: Applications and Reviews, vol. 38, No. 3, May 2008, pp. 397-415 (Year: 2008).*

(Continued)

*Primary Examiner* — Wilbert L Starks
(74) *Attorney, Agent, or Firm* — Paratus Law Group, PLLC

(57) ABSTRACT

There is provided an information processing apparatus and an information processing method to present information for improving development efficiency of a neural network to a user. The information processing method includes: comparing, by a processor, learning results by a plurality of models of neural networks and presenting comparison information relating to the learning results using a graph. In addition, an information processing apparatus includes a control unit configured to acquire learning results by a plurality of models of neural networks and control comparison information relating to the learning results. The control unit presents the comparison information using a graph. In addition, an information processing apparatus includes a comparing unit configured to compare learning results by a plurality of models of neural networks and generate comparison information relating to the learning results. The comparison information is comparison information using a graph.

11 Claims, 14 Drawing Sheets

(51) Int. Cl.
*G06F 16/838* (2019.01)
*G06N 3/04* (2006.01)

(56) References Cited

OTHER PUBLICATIONS

Chen, et al., Multiobjective Neural Network Ensembles Based on Regularized Negative Correlation Learning, IEEE Transactions on Knowledge and Data Engineering, vol. 22, No. 12, Dec. 2010, pp. 1738-1751 (Year: 2010).*

Niemann, Visual Basic Collections and Hash Tables, epaper press, (1999) pp. 1-10 (Year: 1999).*

Apr. 2, 2019, Japanese Office Action issued for related JP Application No. 2017-567959.

Saito et al., Applying Second-Order Learning Algorithm BPQ to Classification Problems and Evaluating It, The Transactions of the Institute of Electronics, Information and Communication Engineers D-II, Feb. 25, 1998, pp. 412-420, vol. J81-D-II, No. 2, The Information and Systems Society, The Institute of Electronics, Information and Communication Engineers.

Akiba et al., Acquiring a Single Decision Tree Representation of Majority Voting Classifiers, IPSJ SIG Notes, Jul. 18-19, 2000, pp. 73-80, 2000-ICS-121, vol. 2000, No. 66, ISSN 0919-6072, Information Processing Society of Japan.

May 21, 2019, Japanese Decision to Grant a Patent issued for related JP Application No. 2017-567959.

Jan. 25, 2019, European Search Report issued for related EP Application No. 16890654.3.

Glorot et al., Understanding the difficulty of training deep feedforward neural networks, Proceedings of the Thirteenth International Conference on Artificial Intelligence and Statistics (AISTATS 2010), May 2010, pp. 249-256, vol. 9, Sardinia, Italy.

Jin et al., Pareto-Based Multiobjective Machine Learning: An overview and Case Studies, IEEE Transactions on Systems, Man, and Cybernetics—Part C: Applications and Reviews, May 2008, pp. 397-415, vol. 38, No. 3.

Abadi et al., TensorFlow: Large-Scale Machine Learning on Heterogeneous Distributed Systems, Nov. 9, 2015, pp. 1-19, Google Research.

* cited by examiner

FIG. 2

```xml
<?xml version="1.0" encoding="UTF-8"?>
-<feedForwardNeuralNet>
    -<layers>
        -<layer type="Affine">
            -<inputs>
                <nodeId>n0</nodeId>
            </inputs>
            -<outputs>
                <nodeId>n1</nodeId>
            </outputs>
            -<args>
                <arg value="Affine" name="name"/>
                -<arg name="inshape">
                    <d>1</d>
                    <d>28</d>
                    <d>28</d>
                </arg>
                -<arg name="outshape">
                    <d>64</d>
                </arg>
                <arg value="True" name="with_bias"/>
                <arg value="bengio2010_tanh" name="init_method"/>
            </args>
        </layer>
        +<layer type="Tanh">
        +<layer type="Affine">
        +<layer type="Softmax">
    </layers>
    +<nodes>
    +<inputs>
    +<outputs>
</feedForwardNeuralNet>
```

FIG. 3

```
#include <stdio.h>
#include <assert.h>
        .
        .
        .

int main(int argc, char* argv[])
{
    network_t* network;
            .
            .
            .

//////////////////////////////////
    // Load network from config file
    load_network(&network, argv[1]);

//////////////////////////////////
    // Dump network
    dump_network(network);

//////////////////////////////////
    // Make context
    context_pointer context;
    initialize_context(&context, network);

//////////////////////////////////
    // Read input buffer
            .
            .
            .
```

FIG. 13

| Environment | | | |
|---|---|---|---|
| Execution host: | ○ Local | ◉ Cloud | |
| Processor type: | ○ CPU | ◉ GPU | |
| Job type: | ○ Single | ○ Distributed | ◉ Parallel |
| | | # | 4 |

INFORMATION PROCESSING METHOD AND INFORMATION PROCESSING APPARATUS

CROSS REFERENCE TO PRIOR APPLICATION

This application is a National Stage Patent Application of PCT International Patent Application No. PCT/JP2016/084964 (filed on Nov. 25, 2016) under 35 U.S.C. § 371, which claims priority to Japanese Patent Application No. 2016-027923 (filed on Feb. 17, 2016), which are all hereby incorporated by reference in their entirety.

TECHNICAL FIELD

The present disclosure relates to an information processing method and an information processing apparatus.

BACKGROUND ART

In recent years, a neural network which imitates a mechanism of a cranial neural system has attracted attention. Further, various kinds of methods for developing a neural network have been proposed. For example, Non-Patent Literature 1 discloses a library for monitoring learning process by a neural network.

CITATION LIST

Non-Patent Literature

Non-Patent Literature 1: Google Research, and 40 others, "TensorFlow: Large-Scale Machine Learning on Heterogeneous Distributed Systems", Nov. 9, 2015, [Online], [Retrieved on Jan. 12, 2016]. Internet, <http://download.tensorflow.org/paper/whitepaper2015.pdf>

DISCLOSURE OF INVENTION

Technical Problem

However, with the library disclosed in Non-Patent Literature 1, it is difficult to compare learning results by a plurality of neural networks.

Therefore, the present disclosure proposes an information processing method and an information processing apparatus which can present information for improving development efficiency of the neural network to a user.

Solution to Problem

According to the present disclosure, there is provided an information processing method including: comparing, by a processor, learning results by a plurality of models of neural networks and presenting comparison information relating to the learning results using a graph.

In addition, according to the present disclosure, there is provided an information processing apparatus including: a control unit configured to acquire learning results by a plurality of models of neural networks and control comparison information relating to the learning results. The control unit presents the comparison information using a graph.

There is provided an information processing apparatus including: a comparing unit configured to compare learning results by a plurality of models of neural networks and generate comparison information relating to the learning results. The comparison information is comparison information using a graph.

Advantageous Effects of Invention

As described above, according to the present disclosure, it is possible to present information for improving development efficiency of a neural network to a user. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 2 is an example of an XML file which defines a network according to the present disclosure.

FIG. 3 is an example of a source code according to the present disclosure.

FIG. 13 is an example of an execution setting screen according to the embodiment.

MODE(S) FOR CARRYING OUT THE INVENTION

Figure 1:
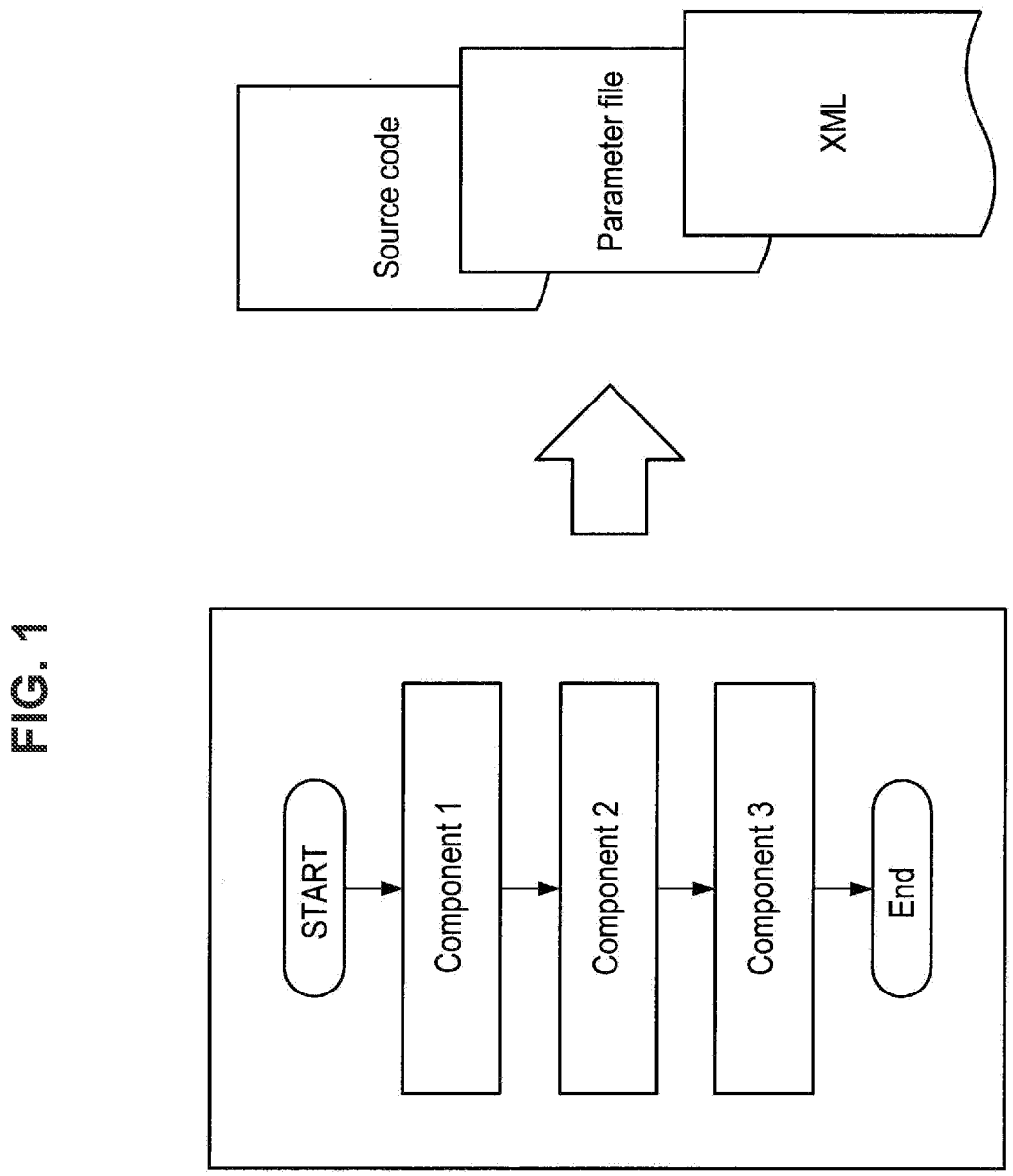
FIG. 1 is a diagram for explaining visual programming according to the present disclosure.

Hereinafter, a preferred embodiment of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description will be provided in the following order.
1. Background
1.1. Neural network
1.2. Outline of visual programming
2. Embodiment
2.1. System configuration example according to present disclosure
2.2. Information processing apparatus according to present embodiment 2.3. Server 30 according to present embodiment
2.4. Explanation of form according to present embodiment
2.5. Comparison information according to present information
2.6. Parallel execution of neural networks
3. Hardware configuration example
4. Conclusion

1. BACKGROUND

<<1.1. Neural Network>>

A neural network refers to a model imitating a human cranial neural circuit and is technology for implementing a human learning ability on a computer. As described above, one feature of a neural network is that it has a learning ability. In a neural network, artificial neurons (nodes) forming a network by synaptic coupling are able to acquire a problem solving ability by changing a synaptic coupling strength through learning. In other words, a neural network is able to automatically infer a problem resolution rule by repeating learning.

Examples of learning by a neural network can include image recognition and speech recognition. In a neural network, it is possible to classify input image information into one of numbers from 0 to 9 by, for example, repeatedly learning handwritten number patterns. The learning ability of the neural network as described above has attracted attention as a key for advancing development of artificial intelligence. Further, pattern recognition of the neural network is expected to be applied in various kinds of industrial fields.

The information processing method and the information processing apparatus according to the present disclosure have been made while attention has been focused on approach for developing a neural network as described above, and can improve development efficiency in a development process of a neural network.

<<1.2. Outline of Visual Programming>>

Subsequently, outline of visual programming according to the present disclosure will be described. In the present disclosure, visual programming refers to approach for creating a program using visual objects without describing a program code in text in software development. In visual programming, for example, it is possible to create a program by operating objects on a graphical user interface (GUI).

FIG. 1 is an image diagram of visual programming according to the present disclosure. FIG. 1 illustrates a product produced on the basis of objects (components) disposed on the GUI. In an example illustrated in FIG. 1, components 1 to 3 are disposed so as to be sequentially processed. Here, the components 1 to 3 may be components respectively meaning, for example, importing of data, processing of data and output of data. Further, as illustrated in FIG. 1, in the visual programming according to the present disclosure, a configuration file of parameters, an XML file which defines a network and a source code which executes ForwardProp (prediction and identification) by loading the above-described two files, or the like, may be generated.

FIG. 2 is an example of the XML file described above. As described above, a network structure relating to a neural network may be defined in the XML file according to the present disclosure. Referring to FIG. 2, in the XML file according to the present disclosure, layers constituting the network, and information relating to a node, input, output, or the like, are defined. Further, as illustrated in FIG. 2, nodes relating to input/output and a neuron number may be defined in each layer. In this manner, in the visual programming according to the present disclosure, it is possible to generate XML which defines a network separately from the source code.

Further, FIG. 3 is an example of the source code which executes ForwarProp described above. As described above, the source code according to the present disclosure loads the XML file which defines the network and the configuration file of the parameter to execute processing. In an example illustrated in FIG. 3, load_network( ) may be a function for loading the above-described designated XML file. Further, dump_network( ) may be a function for dumping the loaded network structure, and initialize_context( ) may be a function for initializing context. In this manner, the source code according to the present disclosure can execute ForwardProp by sequentially performing processing on the basis of information of the loaded file.

As described above, in the visual programming according to the present disclosure, it is possible to separately generate the configuration file of the parameter, the XML file which defines the network and the source code which executes ForwardProp. By this means, it is possible to reuse the above-described three types of files in units of file. A user can acquire processing results by different network structures, for example, by correcting the XML file and causing the source code to load the XML file.

Note that an example illustrated in FIG. 3 is a sample which is an excerption of part of the source code, and appropriate codes may be respectively described before and after each processing. Further, the source code according to the present disclosure is not limited to specific program language and can be changed as appropriate in accordance with development specifications and operation.

The background according to the present disclosure has been described above. As described above, the information processing method and the information processing apparatus according to the present disclosure can improve development efficiency in the development process of a neural network. In the following description of an embodiment, effects provided by characteristics will be described using the characteristics of the information processing method and the information processing apparatus according to the present disclosure.

2. EMBODIMENT

<<2.1. System Configuration Example According to Present Disclosure>>

Figure 4:
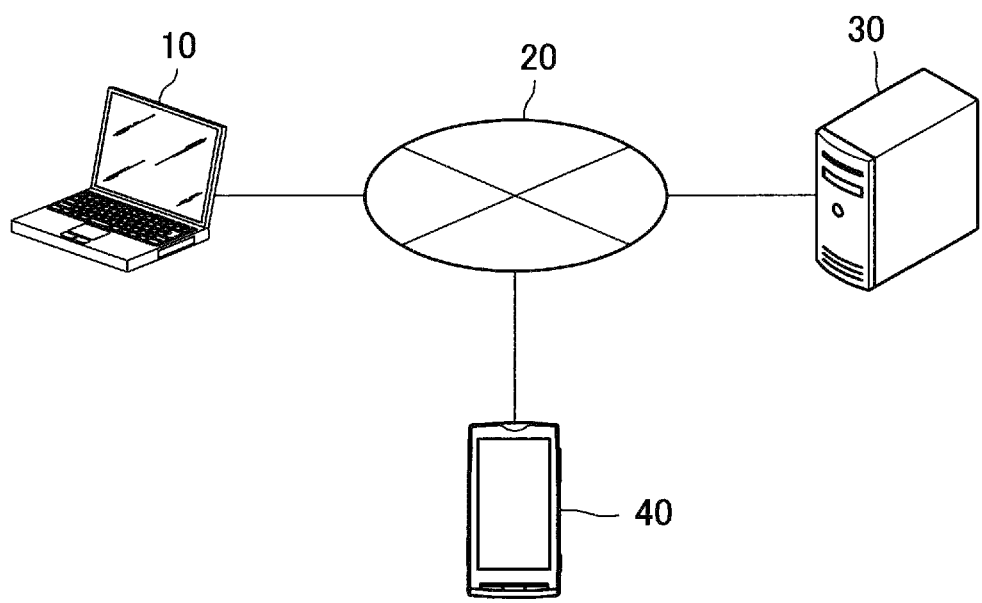
FIG. 4 is a diagram illustrating a system configuration example according to an embodiment of the present disclosure.

First, a system configuration example for implementing the information processing method according to an embodiment of the present disclosure will be described with reference to FIG. 4. Referring to FIG. 4, a system for implementing the information processing method according to the present embodiment includes an information processing apparatus 10, a server 30 and a device 40. Further, the information processing apparatus 10, the server 30 and the device 40 are connected so as to be able to communicate with each other via a network 20.

Here, the information processing apparatus 10 according to the present embodiment is a client terminal which presents a learning result of a neural network to the user. Further, the server 30 is an information processing apparatus which acquires learning results by a plurality of models of neural networks and generates comparison information relating to the learning results. The above-described comparison information may be comparison information using a graph. Still further, the device 40 is hardware which executes the program of the neural network created by the server 30. The device 40 may be, for example, a smartphone, a tablet, a personal computer (PC), or the like.

Further, the network 20 may be a public network such as the Internet, a telephone network and a satellite communication network or may include a private network such as an internet protocol-virtual private network (IP-VPN).

In the information processing method according to the present embodiment, a form for presenting learning results by neural networks to the user is provided. Further, one feature of the information processing method according to the present embodiment is that a processor compares learning results by a plurality of models of neural networks and presents comparison information relating to the learning results using a graph. Further, with the information processing method according to the present embodiment, it is possible to present learning results by neural networks in real time. Still further, the above-described learning results may include a calculation amount, a training error, a validation error, or the like. By this means, it becomes possible to create a plurality of models of neural networks for which network structures and hyper parameters are changed and easily compare the learning results.

<<2.2. Information Processing Apparatus According to Present Embodiment>>

The information processing apparatus 10 according to the present embodiment will be described in detail next. The information processing apparatus 10 according to the present embodiment has a function of acquiring learning results by a plurality of models of neural networks and presenting comparison information relating to the learning results using a graph. Further, the information processing apparatus 10 can accept operation by the user and present comparison information relating to learning results of neural networks designated by the user.

Further, the information processing apparatus 10 has a function of accepting operation by the user and requesting the server 30 to download files relating to execution of a neural network. Here, the file relating to execution of the neural network may include a configuration file of parameters, an XML file which defines a network and a source code which loads the above-described two files to execute ForwardProp.

Figure 5:
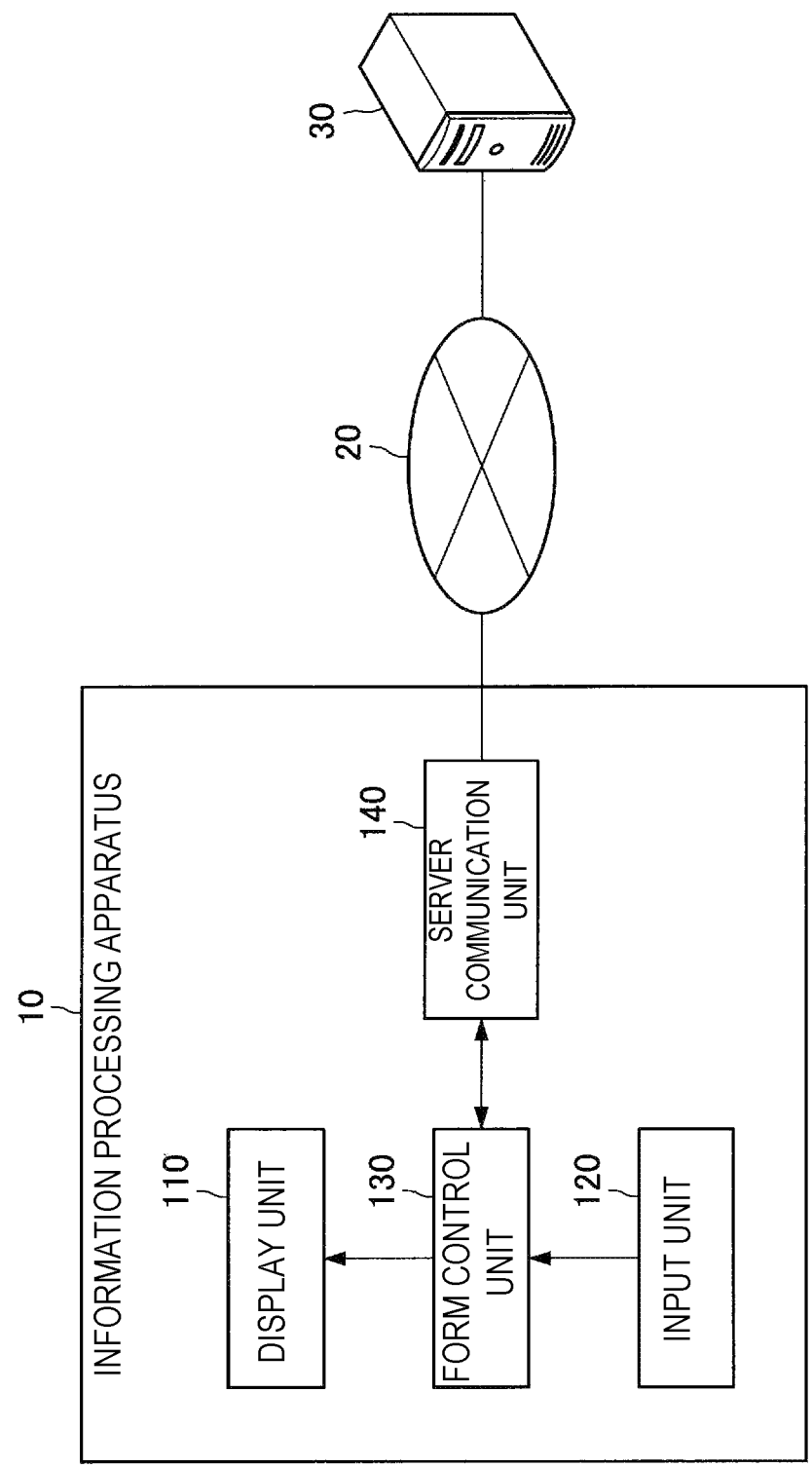
FIG. 5 is a functional block diagram of an information processing apparatus according to the embodiment.

Referring to FIG. 5, the information processing apparatus 10 according to the present embodiment includes a display unit 110, an input unit 120, a form control unit 130 and a server communication unit 140. Each component provided at the information processing apparatus 10 will be described below.

(Display Unit 110)

The display unit 110 has a function of displaying information to be controlled by each component of the information processing apparatus 10. In the present embodiment, particularly, the display unit 110 may have a function of displaying a form for presenting learning results of neural networks. The above-described function may be implemented by, for example, a cathode ray tube (CRT) display apparatus, a liquid crystal display (LCD) apparatus, and an organic light emitting diode (OLED) apparatus. Further, the display unit 110 may have a function as an input unit which accepts information input from the user. The function as the input unit can be implemented by, for example, a touch panel.

(Input Unit 120)

The input unit 120 has a function of accepting information input from the user and handing over the input information to each component of the information processing apparatus 10. In the present embodiment, particularly, the input unit 120 may have a function of accepting user operation on the form for presenting learning results of the neural networks and handing over the input information based on the operation to the form control unit 130 which will be described later. The above-described function may be implemented by, for example, a keyboard or a mouse.

(Form Control Unit 130)

The form control unit 130 has a function of controlling a form for presenting a learning result of a neural network. Specifically, the form control unit 130 has a function of controlling content to be caused to be displayed by the display unit 110 on the basis of information acquired from the server 30 via the server communication unit 140 which will be described later. Further, the form control unit 130 has a function of requesting the server 30 to download information of a neural network which becomes a target and files on the basis of the information acquired from the input unit 120.

(Server Communication Unit 140)

The server communication unit 140 has a function of performing information communication with the server 30 via the network 20. Specifically, the server communication unit 140 transmits information relating to the above-described form to the server 30 on the basis of control by the form control unit 130. Further, the server communication unit 140 hands over the information acquired from the server 30 to the form control unit 130.

<<2.3. Server 30 According to Present Embodiment>>

The server 30 according to the present embodiment will be described in detail next. The server 30 according to the present embodiment is an information processing apparatus which generates comparison information relating to learning results from the learning results by a plurality of models of neural networks. The above-described comparison information may be comparison information using a graph. Further, the server 30 according to the present embodiment has a function of setting different hyper parameters for the plurality of models of neural networks and causing the neural networks to be executed in parallel.

Figure 6:
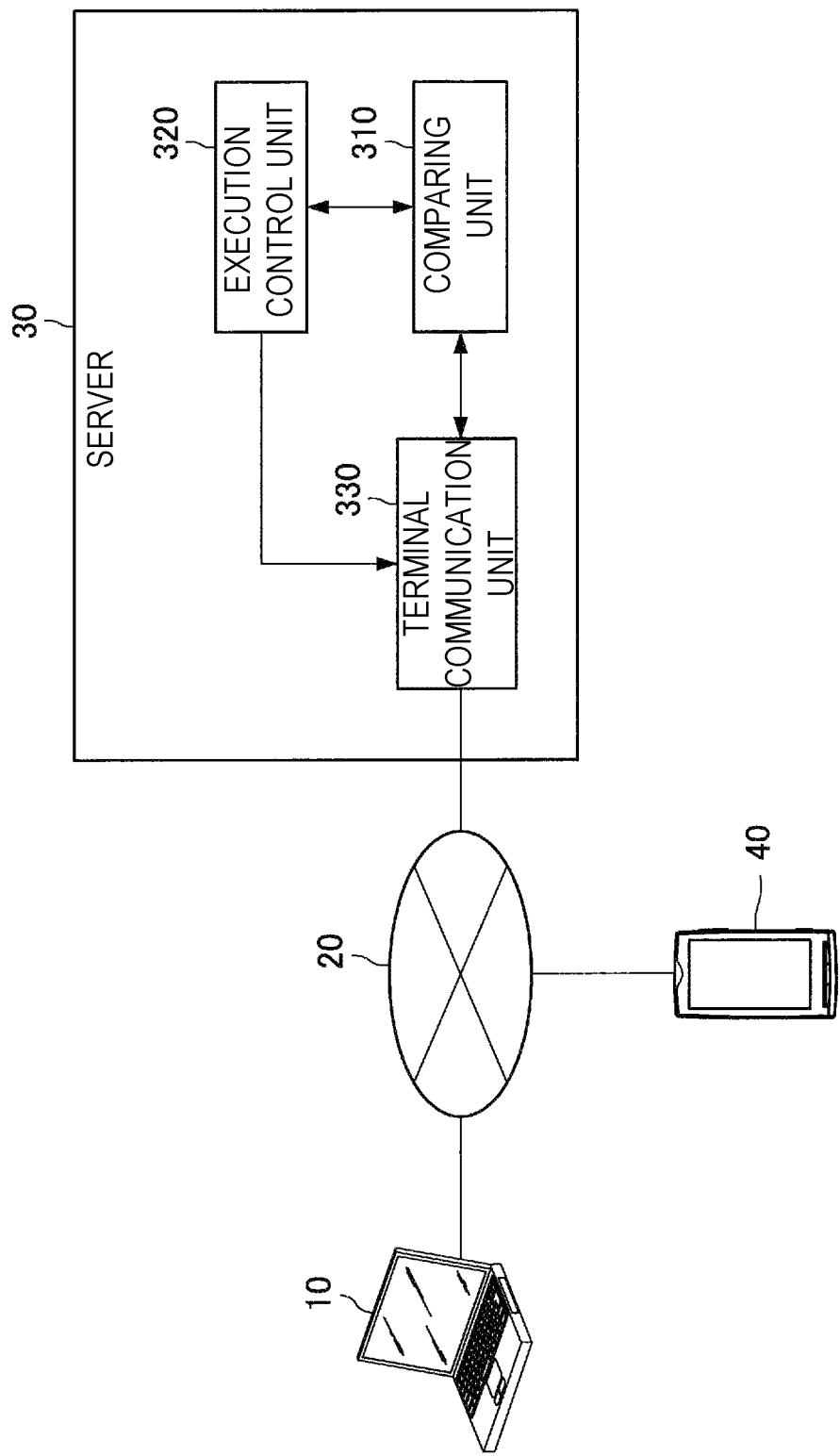
FIG. 6 is a functional block diagram of a server according to the embodiment.

Referring to FIG. 6, the server 30 according to the present embodiment includes a comparing unit 310, an execution control unit 320 and a terminal communication unit 330. Each component provided at the server 30 will be described below.

(Comparing Unit 310)

The comparing unit 310 has a function of acquiring learning results by a plurality of models of neural networks from the execution control unit 320 which will be described later and generating comparison information relating to the learning results. Here, the learning results may include, for example, a calculation amount, a training error and a validation error.

Specifically, the comparing unit 310 can create comparison information using a learning curve graph which indicates relationship between the above-described learning results and training time at the neural networks. Further, the comparing unit 310 can create a graph relating to trade-off information between a calculation amount and errors. Here, the above-described errors may include a training error and a validation error. Further, the comparing unit 310 can create a graph in which the above-described trade-off information is limited with Pareto optimum solution. The user can easily compare performance of neural networks created using visual programming by confirming the comparison information generated by the comparing unit 310 on the information processing apparatus 10.

Further, the comparing unit 310 may generate comparison information of a learning result by a neural network designated by the user on the basis of information acquired from the information processing apparatus 10. By this means, the user can compare learning results by arbitrary neural networks. Further, the comparing unit 310 may acquire learning results of neural networks executed by control of the execution control unit 320 in real time and generate comparison information. By this means, the user can acquire learning results of the neural networks which are being executed in real time and compare the learning results. Note that details relating to generation of the comparison information by the comparing unit 310 will be described later.

(Execution Control Unit 320)

The execution control unit 320 has a function of controlling execution of a neural network implemented at a computing resource on cloud. Further, the execution control unit 320 has a function of acquiring learning results of the neural networks which are caused to be executed in real time. Still further, one feature of the execution control unit 320 according to the present embodiment is that different hyper parameters are respectively automatically set for a plurality of neural networks and learning is executed in parallel. Details of the function by the execution control unit 320 will be described later.

Further, the execution control unit 320 may have a function of causing an emulator or the device 40 to execute neural networks and acquiring learning results. In this event, the execution control unit 320 may cause an emulator connected to the server 30 via the network 20 to execute neural networks and acquire learning results. Alternatively, the execution control unit 320 may have a function as an emulator and may execute processing by neural networks and obtain learning results.

(Terminal Communication Unit 330)

The terminal communication unit 330 has a function of performing information communication with the information processing apparatus 10 and the device 40 via the network 20. Specifically, the terminal communication unit 330 transmits the comparison information generated by the comparing unit 310 to the information processing apparatus 10. Here, the comparison information generated by the comparing unit 310 may include learning results by a plurality of models of neural networks and information of a graph generated on the basis of the learning results. Further, the terminal communication unit 330 receives information of a neural network which becomes a comparison target and a request for downloading files from the information processing apparatus 10. Further, the terminal communication unit 330 has a function of transmitting a request for executing a neural network to the emulator or the device 40 on the basis of control by the execution control unit 320 and acquiring a learning result executed on the basis of the request.

<<2.4. Explanation of Form According to Present Embodiment>>

A form for presenting learning results by neural networks to the user according to the present embodiment will be described next. The form according to the present embodiment presents comparison information of learning results by a plurality of models of neural networks. Note that the form according to the present embodiment may be displayed at the display unit 110 of the information processing apparatus 10. The user can easily compare learning performance of created neural networks by referring to the comparison information displayed on the above-described form.

Figure 7:
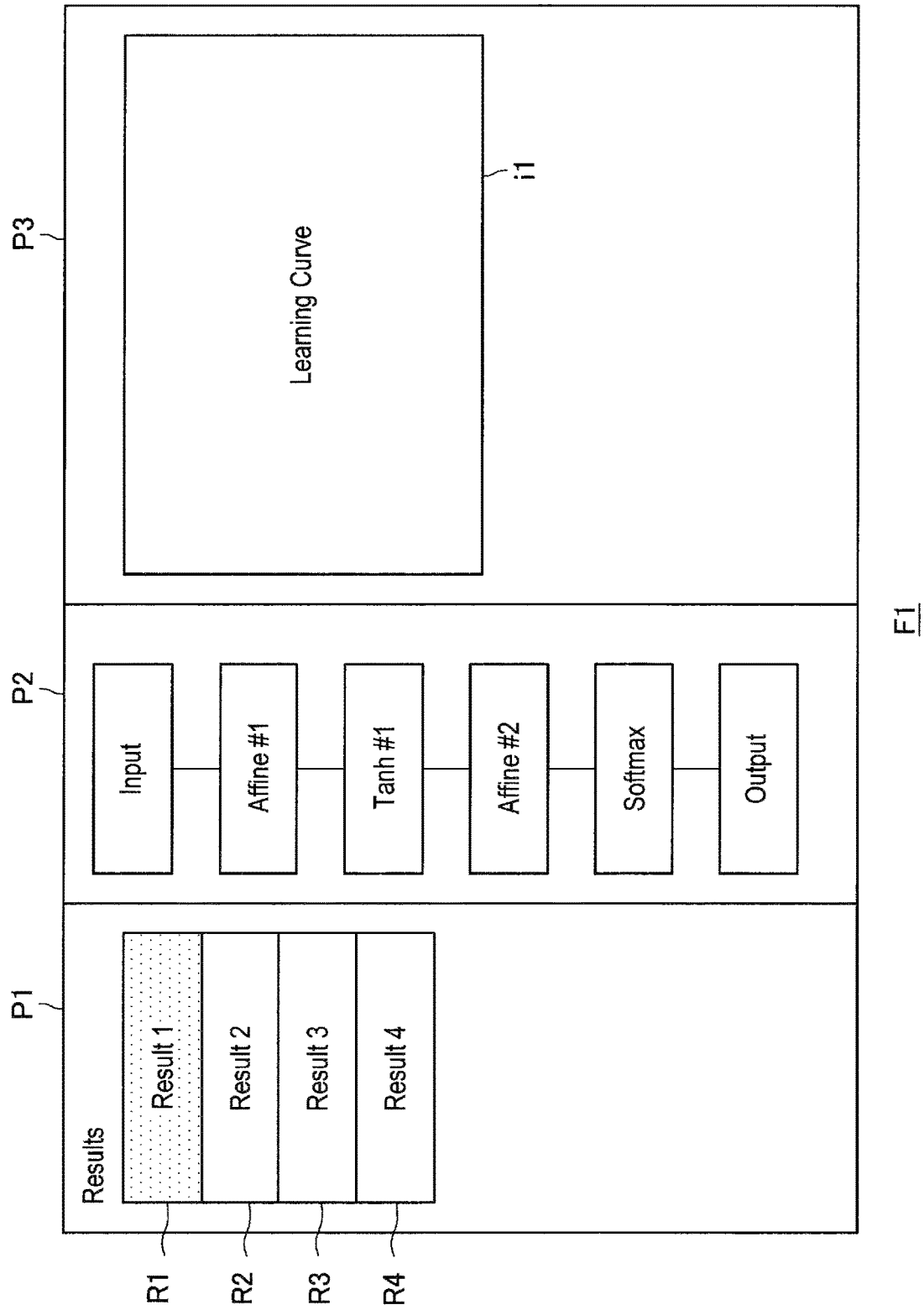
FIG. 7 is a diagram for explaining a form according to the embodiment.

FIG. 7 is a diagram illustrating a configuration example of the form according to the present embodiment. Referring to FIG. 7, a form F1 according to the present embodiment includes palettes P1 to P3. Here, the palette P1 may be a region in which summaries of learning results by neural networks (hereinafter, also referred to as result summaries) are displayed. Further, a palette P2 may be a region in which a network structure of a selected neural network is displayed. Still further, a palette P3 may be a region in which details of the learning result, comparison information, or the like, is displayed. The form control unit 130 according to the present embodiment can control information to be displayed in the palettes P1 to P3 on the basis of information acquired from the server 30.

(Palette P1)

As described above, the palette P1 is a region in which result summaries relating to neural networks are displayed. Referring to FIG. 7, a plurality of result summaries R1 to R4 are displayed in the palette P1.

Figure 8:
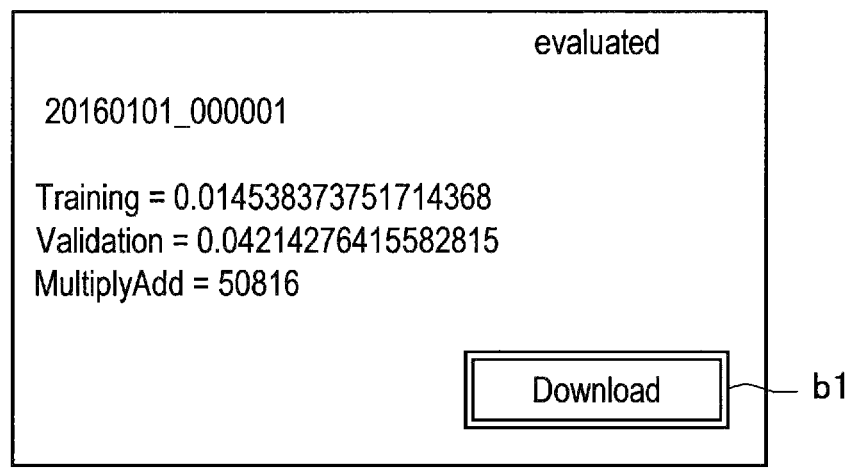
FIG. 8 is a display example of a result summary according to the embodiment.

Subsequently, a result summary to be displayed in the palette P1 will be described in detail using FIG. 8. FIG. 8 is a display example of the result summary to be displayed in the palette P1. In an example illustrated in FIG. 8, the result summary includes date and time of execution, an execution state, a training error, a validation error and a calculation amount. Here, the date and time of execution may be, for example, displayed in a form of "yyyyMMdd_HHmmss", and may be used by the user to identify the execution result. Further, the date and time of execution may be a value set using date and numbering. Further, while not illustrated in FIG. 8, the result summary to be displayed in the palette P1 may include arbitrary name designated by the user.

Further, the execution state may be indicated with a status such as, for example, evaluated, unfinished and interrupted. In an example illustrated in FIG. 8, a status indicating evaluated, "evaluated" is displayed. The user can confirm a condition of learning by a neural network by confirming the execution state.

Further, the training error, the validation error and the calculation amount may be respectively the latest values in learning process. That is, the above-described three items included in the result summary are updated in real time during the progress of learning. By this means, the user can always confirm the latest learning result. Note that, in an example illustrated in FIG. 8, the number of times of multiply add is displayed as the calculation amount.

Further, as illustrated in FIG. 8, on the result summary, a button b1 for downloading files relating to execution of a neural network may be disposed. As described above, the files relating to execution of the neural network may include a configuration file of parameters, an XML file which defines a network and a source code which loads the above-described two files to execute ForwardProp. The user can specify a neural network for which a learning result is favorable and download files relating to execution of the neural network for which learning has been finished by confirming comparison information indicated in the form F1. Further, it is possible to reuse the above-described three types of files in units of file because the configuration file of parameters and the XML file which defines the network can be downloaded while being separated from the source code.

Note that, while an example where a download button of files is disposed has been described in FIG. 8, downloading of files according to the present embodiment may be realized using methods other than button operation. Downloading of files according to the present embodiment may be executed, for example, from menu which is displayed by the result summary being right-clicked.

(Palette P2)

Referring to FIG. 7 again, description of the form F1 according to the present embodiment will be continued. As described above, the palette P2 is a region in which a network structure of the selected neural network is indicated. An example illustrated in FIG. 7 illustrates a state where the result summary R1 is selected. That is, in the palette P2 illustrated in FIG. 7, a network structure of a neural network relating to the result summary R1 is indicated.

Referring to FIG. 7, in the palette P2, components corresponding to layers constituting the neural network which are connected by straight lines are illustrated. Here, "Input" and "Output" may be components indicating an input layer and an output layer. Further, "Affine #1" and "Affine #2" may be components indicating Affine layers which are one type of middle layers. Still further, "Tan h" and "Softmax" may be components respectively indicating corresponding activating functions. In this manner, in visual programming according to the present embodiment, it is possible to visually perform programming by connecting components corresponding to layers of the neural network.

The network structure of the neural network displayed in the palette P2 according to the present embodiment has been described above. As described above, as a result of the network structure of the selected neural network being displayed in the palette P2, the user can confirm the learning result and the network structure on one screen. By this means, the user can compare learning results by a plurality of models of neural networks in more details. Note that, because the Affline layers and the activating functions described above are widely utilized in development of a neural network, detailed description will be omitted.

(Palette P3)

The palette P3 is a region in which details of learning results, comparison information of learning results relating to a plurality of models of neural networks, or the like, are displayed. In an example illustrated in FIG. 7, in the palette P3, learning curves of the neural network relating to the result summary R1 selected in the palette P1 is displayed as information i1. In this manner, the palette P3 may be a region for displaying information designated through user operation.

Figure 9:
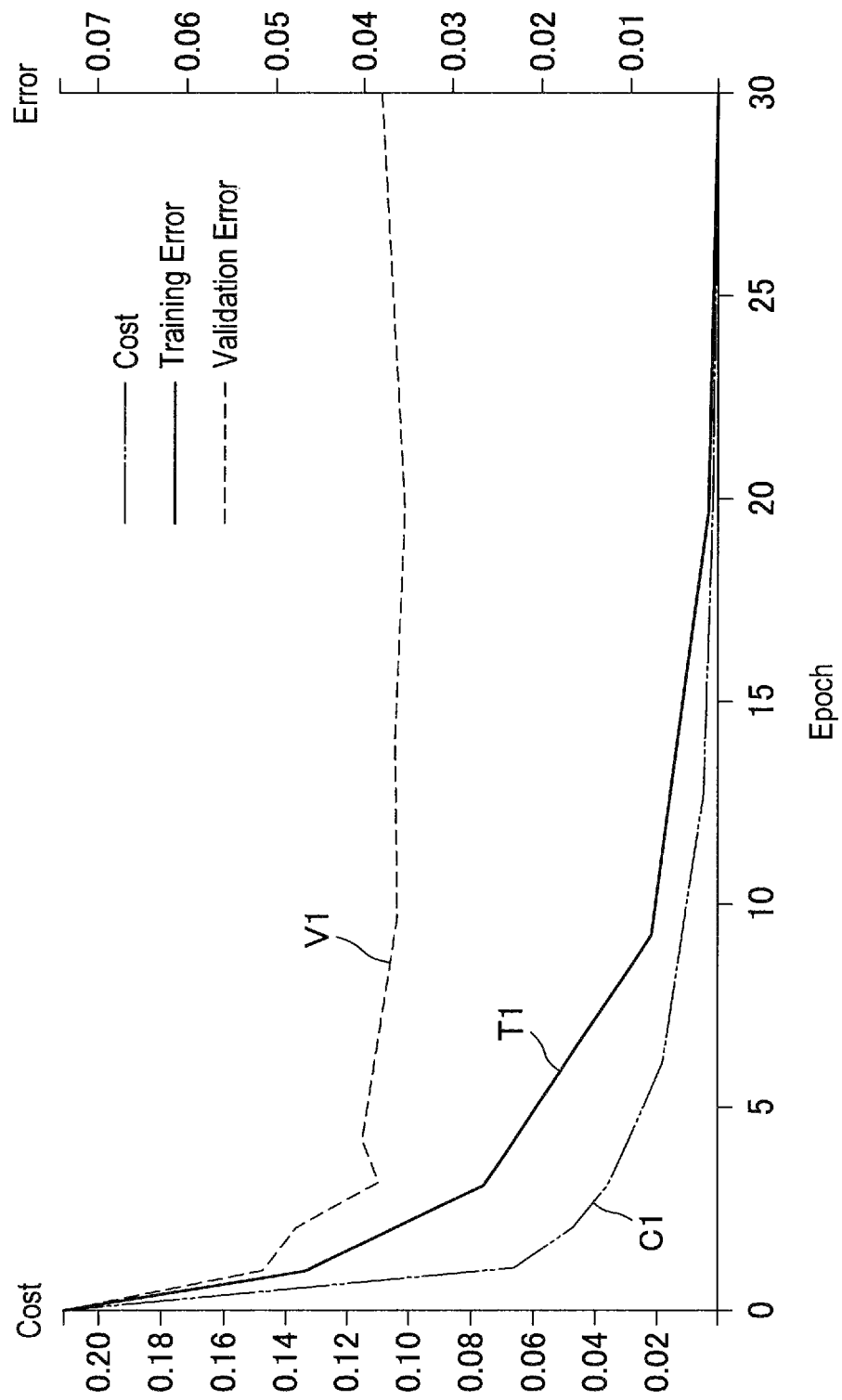
FIG. 9 is a display example of learning curves according to the embodiment.

FIG. 9 is a display example of the learning curves of the neural network displayed in the palette P3. Referring to FIG. 9, a graph relating to the learning curves indicates a calculation amount and an error rate of a target function on a vertical axis and indicates training time on a horizontal axis. Here, a curve C1 may be a curve indicating a calculation amount of the target function. Note that, in the example illustrated in FIG. 9, the curve C1 indicates the number of times of multiply add. Further, a curve T1 and a curve V1 may be curves respectively indicating the training error and the validation error. The user can comprehensively judge the learning result of the neural network by confirming the calculation amount and errors indicated with the curves C1, T1 and V1. Note that in the case where learning relating to the selected neural network is being executed, each information indicated with the learning curve may be updated in real time.

A configuration of the form F1 according to the present embodiment and an example of the displayed information have been described above. The form control unit 130 of the information processing apparatus 10 according to the present embodiment can control display of the form F1 on the basis of the information acquired from the server 30. By this means, the user can confirm the network structure and the learning result of the neural network on the same screen, so that it is possible to improve efficiency relating to development of a neural network.

Note that information other than the information described above may be displayed on the form F1 according to the present embodiment. For example, the form F1 according to the present embodiment may further include a palette P4, and a log relating to execution of a neural network may be displayed in the palette P4. A configuration of the form F1 according to the present embodiment can be designed as appropriate in accordance with characteristics of a neural network to be developed, development procedure, or the like.

<<2.5. Comparison Information According to Present Embodiment>>

The comparison information according to the present embodiment will be described in detail next. In the information processing method according to the present embodiment, it is possible to generate comparison information from learning results by a plurality of models of neural networks and present the comparison information to the user. That is, the comparing unit 310 of the server 30 can generate comparison information on the basis of the learning results of the neural networks acquired by the execution control unit 320. Further, the form control unit 130 of the information processing apparatus 10 can acquire the comparison information generated by the comparing unit 310 and cause the comparison information to be displayed on the form F1. The comparison information according to the present embodiment will be described below in detail using specific examples. Note that the comparison information which will be described below may be displayed in the palette P3 on the form F1.

(Comparison Using Learning Curves)

In the information processing method according to the present embodiment, it is possible to compare and present learning curves relating to a plurality of neural networks. The comparing unit 310 according to the present embodiment can acquire information of a plurality of neural networks selected on the basis of user operation from the information processing apparatus 10 and generate learning curves relating to the plurality of neural networks as the comparison information.

Figure 10:
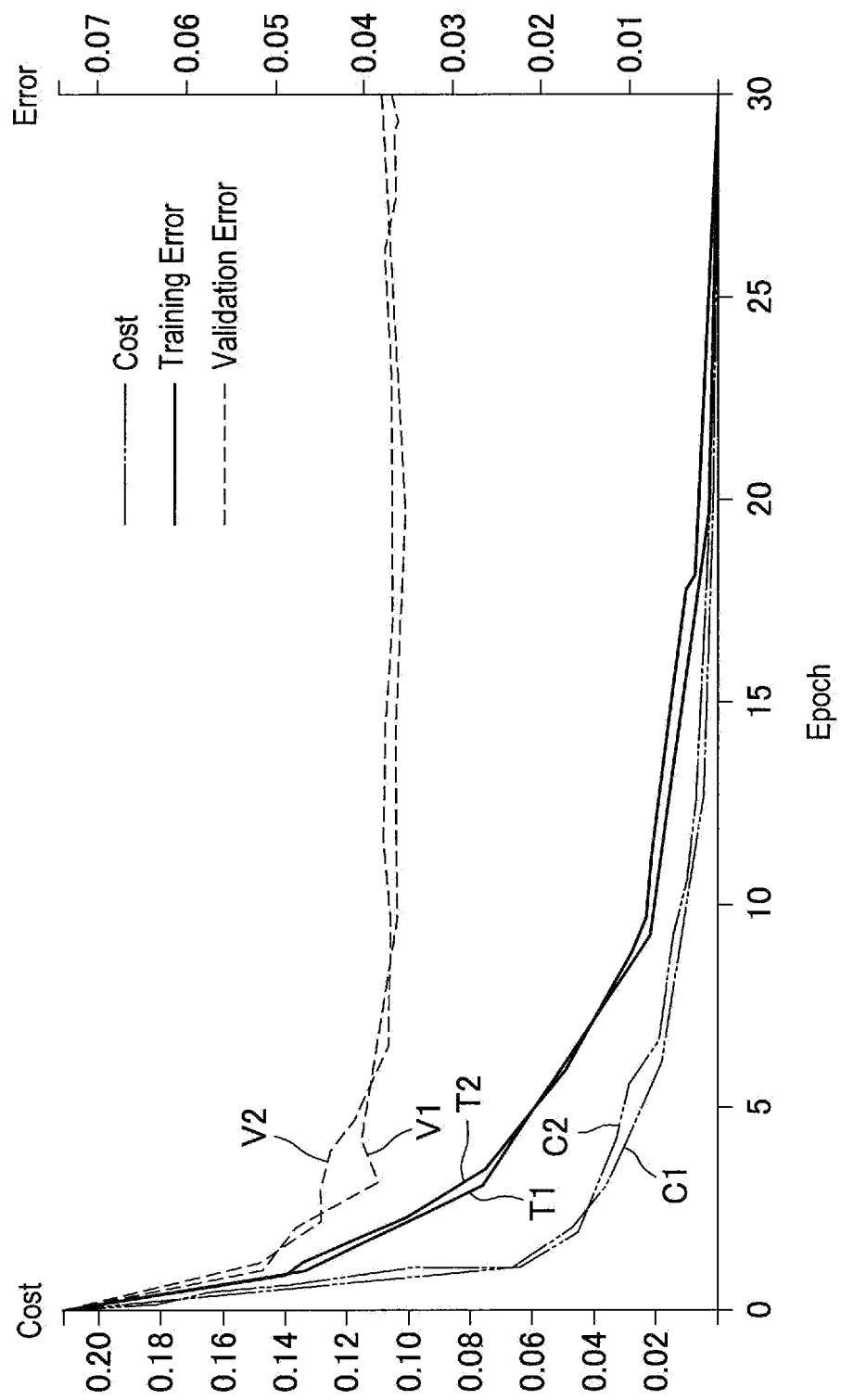
FIG. 10 is a display example of comparison using the learning curves according to the embodiment.

FIG. 10 is an example of comparison using the learning curves according to the present embodiment. Referring to FIG. 10, unlike with an example of the learning curves illustrated in FIG. 9, information of calculation amounts and errors relating to two neural networks are illustrated. An example illustrated in FIG. 10 may be a display example in the case where the result summary R2 is further selected from a state where the result summary R1 is selected on the palette P1 illustrated in FIG. 7. That is, in an example illustrated in FIG. 10, in addition to the example in FIG. 9 which illustrates the learning curves by the neural network relating to the result summary R1, learning curves by a neural network relating to the result summary R2 are further illustrated.

In an example in FIG. 10, the calculation amount, the training error and the validation error of the neural network relating to the result summary R1 are respectively indicated with the curve C1, the curve T1 and the curve V1. Further, a calculation amount, a training error and a validation error of the neural network relating to the result summary R2 are respectively indicated with a curve C2, a curve T2 and a curve V2. Note that the learning curves relating to the respective neural networks may be indicated with different colors. In this manner, in the information processing method according to the present embodiment, it is possible to present learning curves relating to a plurality of neural networks as the comparison information. The user can compare learning results of the created plurality of models in association with network structures by confirming the learning curves.

Further, while FIG. 10 illustrates an example where the learning curves relating to the two neural networks are compared, in the information processing method according to the present embodiment, learning curves relating to three or more neural networks may be presented. In development of a neural network, because a plurality of models with different network structures and hyper parameters are often compared and studied, it is possible to improve user friendliness by presenting learning curves relating to a plurality of models of neural networks.

Further, as the learning curves according to the present embodiment, only an item designated by the user among the calculation amount, the training error and the validation error may be displayed as a comparison target. The user may switch between display and non-display of each item by, for example, clicking a legend on the graph. According to the above-described function, it is possible to display only items which the user desires to compare, so that it is possible to reduce an information amount on the graph. The above-described function relating to designation of display items is particularly effective in the case where the number of neural networks to be compared increases.

Note that, while comparison of the learning results of the neural networks executed by a computing resource, or the like, on cloud has been described above, in the information processing method according to the present embodiment, it is possible to perform comparison with a learning result by the emulator or the device 40. In this case, the execution control unit 320 may cause the emulator or the device 40 to execute the designated neural network and acquire a learning result. Further, the comparing unit 310 can generate comparison information on the basis of the learning result. By this means, the user can understand a difference with the learning result based on specifications of the device 40.

(Comparison Using Trade-Off Information)

Trade-off information according to the present embodiment will be described next. Normally, in the neural network, learning accuracy tends to be improved as a calculation amount increases. In other words, in a neural network, the calculation amount and errors have so-called trade-off relationship. Therefore, the trade-off information according to the present embodiment may be information indicating relationship between the calculation amount and the errors.

In the information processing method according to the present embodiment, it is possible to present relationship between the calculation amounts and errors relating to a plurality of models of neural networks as the trade-off information. In this manner, the comparison information according to the present embodiment may include the trade-off information. The comparing unit 310 according to the present embodiment can acquire learning results relating to a plurality of neural networks from the execution control unit 320 from the information processing apparatus 10 and generate the above-described trade-off information.

Figure 11:
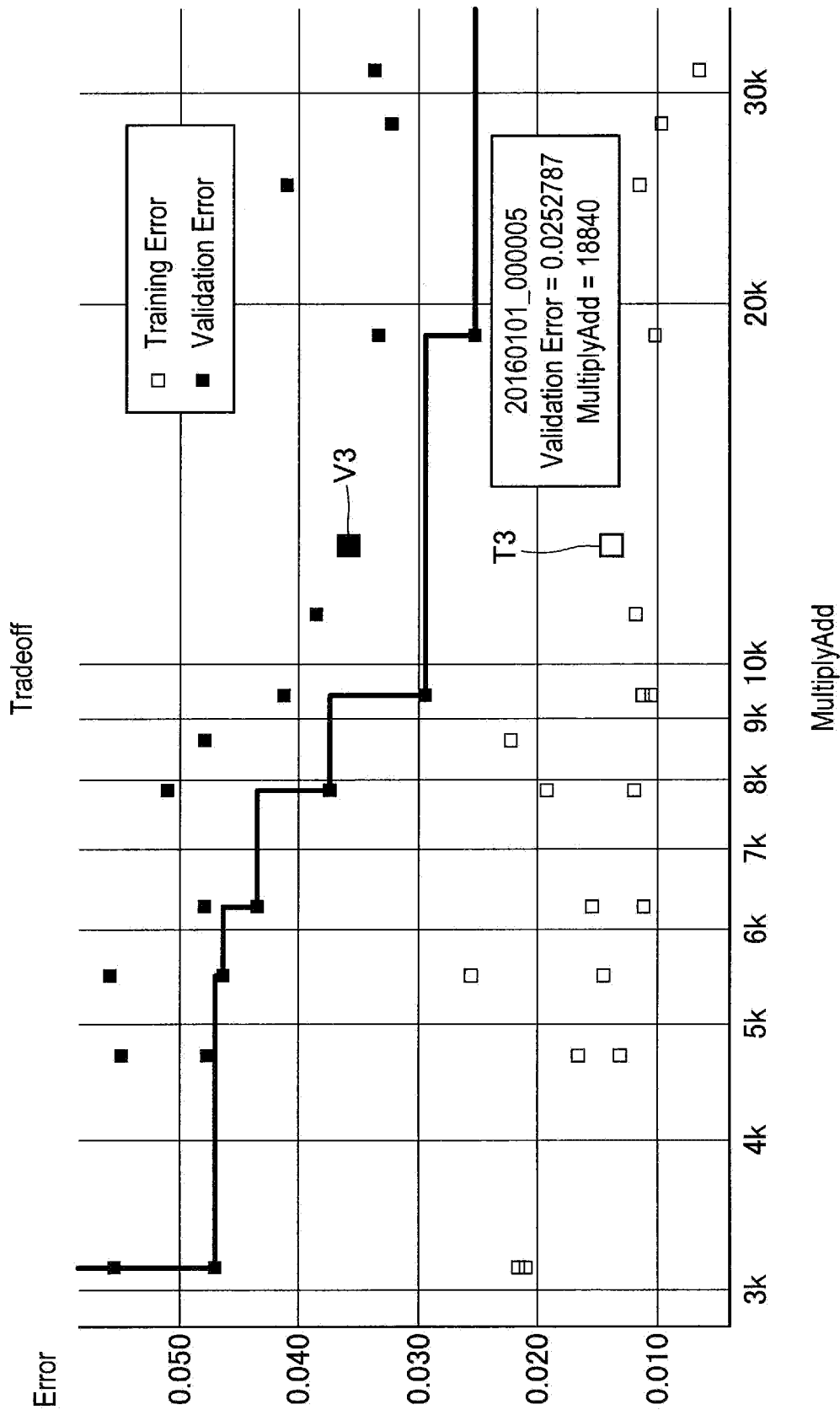
FIG. 11 is a display example of trade-off information according to the embodiment.

FIG. 11 is a display example of the trade-off information according to the present embodiment. Referring to FIG. 11, in a graph relating to the trade-off information which indicates an error rate on a vertical axis and indicates a calculation amount on a horizontal axis, error information relating to a plurality of neural networks are plotted. In an example illustrated in FIG. 11, training errors are indicated with rectangles only with frame borders, and validation errors are indicated with filled rectangles.

Note that, in the trade-off information according to the present embodiment, the above-described training error and validation error may be indicated with a color different for each neural network. As a result of the error information being displayed with a color different for each neural network, the user can identify error information relating to different neural networks. Further, as a result of error information relating to the same neural network being displayed with the same color, the user can recognize the training error and the validation error relating to the same neural network in association with each other.

Further, the comparing unit 310 according to the present embodiment may generate the trade-off information on the basis of all the learning results executed in the past. In development of a neural network, learning results are often compared by creating a plurality of models of neural networks for which network structures and hyper parameters are changed. In other words, the user determines a network structure and values of hyper parameters to be employed by creating a plurality of models of neural networks and comparing learning results. Therefore, as a result of the comparing unit 310 generating trade-off information based on all the learning results in the past, the user can determine a network structure and values of hyper parameters to be employed by comparing learning results of a plurality of models at a time.

Meanwhile, the comparing unit 310 according to the present embodiment may generate trade-off information while limiting learning results to learning results of neural networks selected by the user or may generate trade-off information while limiting learning results to learning results of neural networks which are executed in parallel which will be described later. In this manner, in the information processing method according to the present embodiment, by limiting an information amount to be displayed on a graph, it is possible to present comparison information in accordance with the user's purpose.

Further, as illustrated in FIG. 11, in the trade-off information according to the present embodiment, a result summary of the neural network relating to the selected error information may be displayed on the graph. An example illustrated in FIG. 11 illustrates a state where a training error T3 is selected by the user. In this event, the training error T3 and a validation error V3 corresponding to the training error T3 may be highlighted. Further, on the graph, a result summary R5 of the neural network relating to the training error T1 may be displayed. In this manner, as a result of a result summary of the neural network relating to the selected error information being displayed, the user can specific a neural network relating to the selected error information. Note that it is also possible to allow the user to download files relating to execution of the neural network by operating a result summary displayed on the graph relating to the trade-off information.

Subsequently, limited display using Pareto optimum solution of the trade-off information according to the present embodiment will be described. In the information processing method according to the present embodiment, it is possible to limit the trade-off information described above using Pareto optimum solution and present only trade-off information relating to the corresponding neural network to the user. That is, according to the information processing method according to the present embodiment, it is possible to present trade-off information while limiting learning results to learning results for which indexes of one of an error rate and a calculation amount exceed indexes of one of an error rate and a calculation amount of other learning results. By this means, the user can intuitively understand neural networks to be compared, so that it is possible to make work relating to comparison more efficient.

Figure 12:
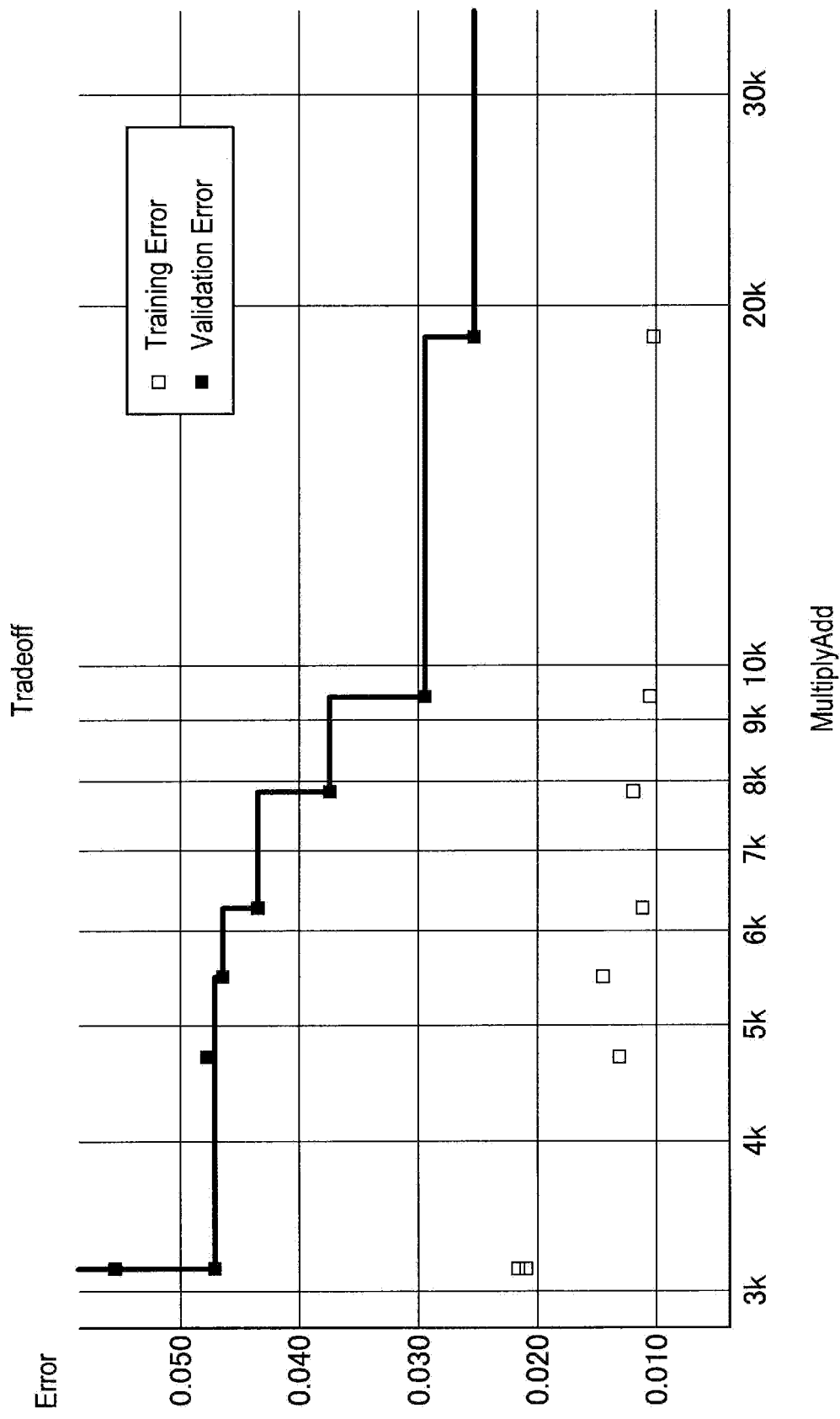
FIG. 12 is a diagram for explaining Pareto optimum solution of the trade-off information according to the embodiment.

FIG. 12 is an example in the case where the trade-off information illustrated in FIG. 11 is limited using Pareto optimum solution. Referring to FIG. 12, it can be understood that the number of pieces of error information plotted on the graph decreases compared to FIG. 11. In an example illustrated in FIG. 12, Pareto optimum solutions relating to validation errors are indicated using lines connecting respective plots. Referring to FIG. 12, it can be understood that plots for validation errors which are larger than the lines indicating the Pareto optimum solutions and plots of training errors corresponding to the validation errors disappear. Note that the Pareto optimum solution according to the present embodiment may be discerned for each training error or for each validation error.

The trade-off information according to the present embodiment has been described above. As described above, according to the information processing method according to the present embodiment, it is possible to present relationship between calculation amounts and errors relating to a plurality of models of neural networks as the trade-off information. Further, according to the information processing method according to the present embodiment, it is possible to present the above-described trade-off information while limiting the trade-off information using Pareto optimum solution. By this means, the user can determine a network structure and values of hyper parameters to be applied by confirming learning results relating to a plurality of models of neural networks at a time.

<<2.6. Parallel Execution of Neural Networks>>

Parallel execution of neural networks according to the present embodiment will be described next. In the information processing method according to the present embodiment, it is possible to automatically set different hyper parameters respectively for a plurality of neural networks and cause learning to be executed in parallel. The execution control unit 320 according to the present embodiment can acquire information relating to parallel execution designated by the user from the information processing apparatus 10 and cause learning by the neural networks to be executed in parallel on the basis of the information.

FIG. 13 is an example of a setting screen relating to execution of a neural network displayed on the form F1. The user can set conditions relating to execution of the neural network by designating values of respective items displayed on the screen. Referring to FIG. 13, the setting screen relating to execution of the neural network includes three items of "Exection host", "Processor type" and "Job type".

Here, "Exection host" may be an item for designating a host which executes learning by a neural network. The user can designate, for example, a local computing resource or a computing resource on cloud as a host.

Further, "Processor type" may be an item for designating a processor relating to execution of a neural network. The user can designate, for example, a central processing unit (CPU) or a graphics processing unit (GPUGPU) as the processor.

Further, "Job type" may be an item for designating a type of execution of a neural network. The user can designate a type of execution from, for example, single execution, distributed execution by a plurality of resources and parallel execution of a plurality of neural networks. The execution control unit 320 according to the present embodiment may cause learning by a plurality of neural networks to be executed in parallel on the basis that parallel execution is designated as "Job type". In this event, the execution control unit 320 can determine the number of neural networks to be executed in parallel on the basis of a numerical value designated on the setting screen. An example illustrated in FIG. 13 illustrates a case where the user designates four as the number of neural networks to be executed in parallel.

As described above, the execution control unit 320 according to the present embodiment can automatically set different hyper parameters respectively for a plurality of neural networks on the basis of information designated by the user and cause learning to be executed in parallel. In this event, the execution control unit 320 may set values of hyper parameters by sampling n neural networks executed in parallel from standard normal distribution (X; setting value, 1) in which a parameter value relating to a neural network set in advance is set as an average. Further, the execution control unit 320 may implement clipping using two sigma to exclude large values of outliers.

The parallel execution of neural networks according to the present embodiment has been described in detail above. In the information processing method according to the present embodiment, it is, of course, possible to acquire learning results of neural networks caused to be executed in parallel and present comparison information relating to the learning information to the user. For example, the comparing unit 310 according to the present embodiment can acquire learning results of neural networks executed in parallel in real time and generate learning curves or trade-off information. Therefore, according to the information processing method according to the present embodiment, it is possible to reduce burden for the user to manually set values of hyper parameters and further compare and present learning results by a plurality of models of neural networks.

3. HARDWARE CONFIGURATION EXAMPLE

Figure 14:
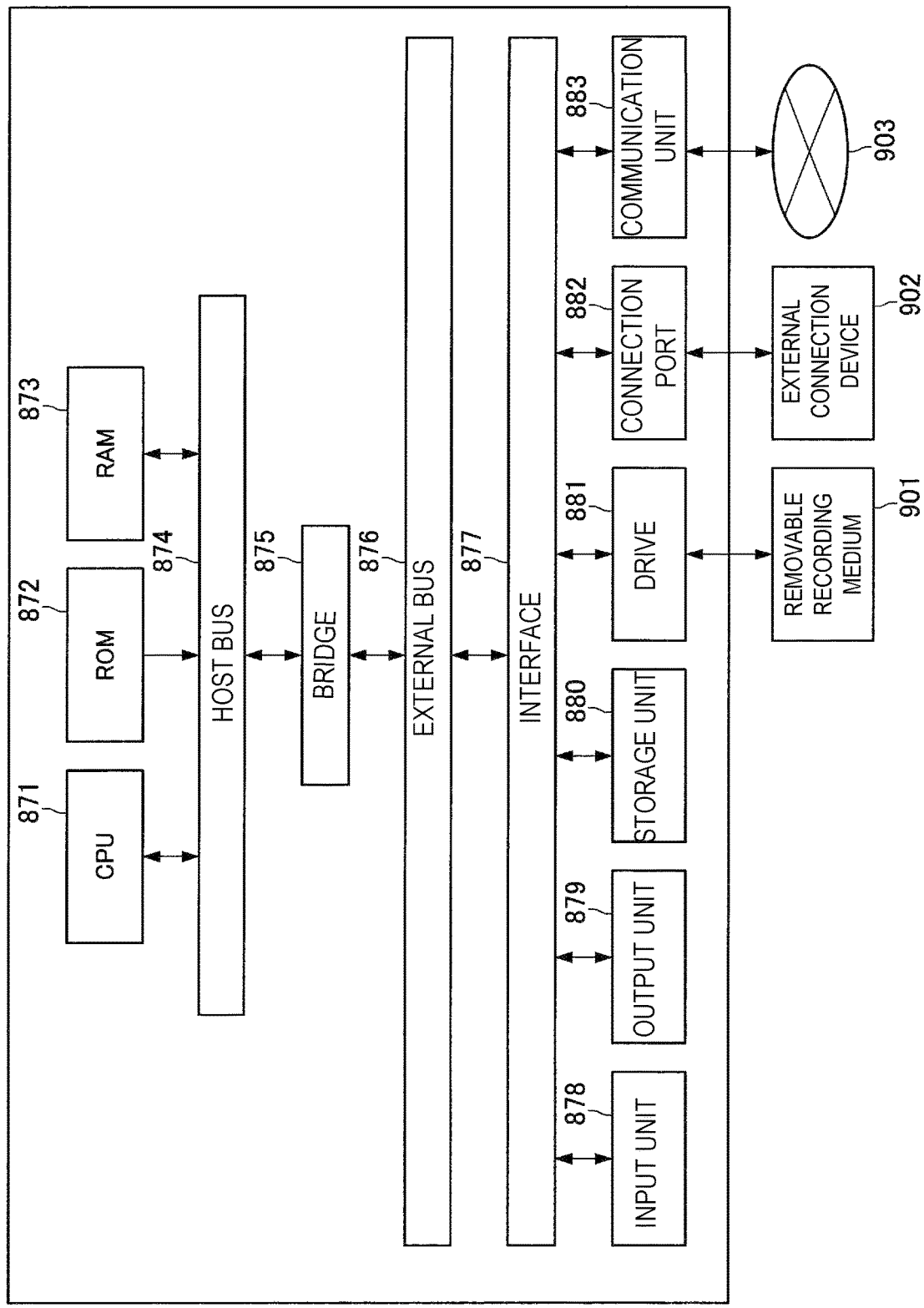
FIG. 14 is a diagram illustrating a hardware configuration example according to the present disclosure.

Next, a hardware configuration example common to the information processing apparatus 10, the server 30, and the device 40 according to the present disclosure will be described. FIG. 14 is a block diagram illustrating a hardware configuration example of each of the information processing apparatus 10, the server 30, and the device 40 according to the present disclosure. Referring to FIG. 14, each of the information processing apparatus 10, the server 30, and the device 40 includes, for example, a CPU 871, a ROM 872, a RAM 873, a host bus 874, a bridge 875, an external bus 876, an interface 877, an input unit 878, an output unit 879, a storage unit 880, a drive 881, a connection port 882, and a communication unit 883. The hardware configuration described here is an example, and some components may be omitted. A component other than components described here may be further added.

(CPU 871)

The CPU 871 functions as, for example, an operation processing device or a control device and controls operations of all or some of the components on the basis of various kinds of programs recorded in the ROM 872, the RAM 873, the storage unit 880, or a removable recording medium 901.

(ROM 872 and RAM 873)

The ROM 872 is a device that stores programs read by the CPU 871, data used for operations, and the like. For example, a program read by the CPU 871, various kinds of parameters that appropriately change when the program is executed, and the like are temporarily or permanently stored in the RAM 873.

(Host Bus 874, Bridge 875, External Bus 876, and Interface 877)

For example, the CPU 871, the ROM 872, and the RAM 873 are connected to one another the host bus 874 capable of performing high-speed data transmission. On the other hand, for example, the host bus 874 is connected to an external bus 876 having a relatively low data transmission speed via the bridge 875. Further, the external bus 876 is connected to various components via the interface 877.

(Input Unit 878)

Examples of the input unit 878 include a mouse, a keyboard, a touch panel, a button, a switch, and a lever. Further, a remote controller capable of transmitting a control signal using infrared rays or other radio waves (hereinafter referred to as a remote controller) may be used as the input unit 878.

(Output Unit 879)

The output unit 879 is a device which is capable of notifying the user of acquired information visually or audibly such as, for example, a display device such as a cathode ray tube (CRT), an LCD, or an organic EL, an audio output device such as a speaker or a headphone, a printer, a mobile phone, a facsimile.

(Storage Unit 880)

The storage unit 880 is a device that stores various kinds of data. Examples of the storage unit 880 include a magnetic storage device such as a hard disk drive (HDD), a semiconductor storage device, an optical storage device, and a magneto-optical storage device.

(Drive 881)

The drive 881 is a device that reads out information recorded in the removable recording medium 901 such as a magnetic disk, an optical disk, a magneto-optical disk, a semiconductor memory, or the like or writes information in the removable recording medium 901.

(Removable Recording Medium 901)

Examples of the removable recording medium 901 include a DVD medium, a Blu-ray (a registered trademark) medium, an HD DVD medium, and various kinds of semiconductor storage media. It will be appreciated that the removable recording medium 901 may be, for example, an IC card in which a non-contact type IC chip is mounted, an electronic device, or the like.

(Connection Port 882)

The connection port 882 is a port for connecting an external connection device 902 such as a universal serial bus (USB) port, an IEEE 1394 port, a small computer system interface (SCSI), an RS-232C port, or an optical audio terminal.

(External Connection Device 902)

Examples of the external connection device 902 include a printer, a portable music player, a digital camera, a digital video camera, and an IC recorder.

(Communication Unit 883)

The communication unit 883 is a communication device that establishes a connection with the network 903, and examples of the communication unit 883 include a communication card for wired or wireless LAN, Bluetooth (a registered trademark), or wireless USB (WUSB), an optical communication router, an asymmetric digital subscriber line (ADSL) router, and various kinds of communication modems.

4. CONCLUSION

As described above, in the information processing method according to the present disclosure, it is possible to generate comparison information from learning results by a plurality of models of neural networks and present the comparison information to the user. The comparison information may include comparison using learning curves and trade-off information between a calculation amount and errors. Further, in the information processing method according to the present disclosure, it is possible to automatically set different parameters respectively for a plurality of neural networks and cause learning to be executed in parallel. According to such a configuration, it is possible to present information which improves development efficiency of a neural network to the user.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, while, in the above-described embodiment, a neural network created by visual programming has been described, the present technology is not limited to such an example. The neural network according to the present disclosure may be created by, for example, a program code being described in text.

Further, for example, while, in the above-described embodiment, a case has been described as an example where the server 30 generates comparison information based on learning results, the present technology is not limited to such an example. For example, generation of the comparison information may be realized by the information processing apparatus 10. In this case, the form control unit 130 of the information processing apparatus 10 can acquire learning results of a plurality of neural networks and generate comparison information on the basis of the learning results.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing method including:

comparing, by a processor, learning results by a plurality of models of neural networks and presenting comparison information relating to the learning results using a graph.

(2)

The information processing method according to (1), in which the learning results include at least one of a calculation amount, a training error, and a validation error.

(3)

The information processing method according to (1) or (2), in which the comparison information includes comparison using learning curves indicating relationship between the learning results and training time in the neural networks.

(4)

The information processing method according to (2), in which the comparison information includes comparison using trade-off information between the calculation amount and an error, and the error includes at least one of the training error and the validation error.

(5)

The information processing method according to (4), in which the comparison information includes comparison in which the trade-off information is limited using Pareto optimum solution.

(6)

The information processing method according to any of (1) to (5), in which the comparison information of the neural networks designated by a user is presented.

(7)

The information processing method according to any of (1) to (6), further including:

causing learning by a plurality of models of neural networks to be executed in parallel.

(8)

The information processing method according to any of (1) to (7), in which different hyper parameters are respectively set for a plurality of neural networks, and learning is caused to be executed in parallel.

(9)

The information processing method according to (7) or (8), in which the comparison information relating to the plurality of models of neural networks executed in parallel is presented in real time.

(10)

The information processing method according to any of (1) to (9), in which the neural networks are created by visual programming.

(11)

The information processing method according to any of (1) to (10), in which downloading of files relating to execution of the neural networks designated by a user is allowed.

(12)

The information processing method according to (11), in which the files relating to execution of the neural networks includes at least one of a network definition file, a parameter file, and a source code.

(13)

An information processing apparatus including:

a control unit configured to acquire learning results by a plurality of models of neural networks and control comparison information relating to the learning results, in which the control unit presents the comparison information using a graph.

(14)

An information processing apparatus including:

a comparing unit configured to compare learning results by a plurality of models of neural networks and generate comparison information relating to the learning results, in which the comparison information is comparison information using a graph.

REFERENCE SIGNS LIST 10 information processing apparatus
110 display unit
120 input unit
130 form control unit
140 server communication unit
20 network
30 server
310 comparing unit
320 execution control unit
330 terminal communication unit
40 device

What is claimed is:

1. An information processing method comprising:

acquiring learning results by a plurality of models of neural networks;

comparing, by a processor, the learning results by a plurality of models of neural networks and controlling comparison information relating to the learning results; and presenting the comparison information relating to the learning results using a graph, wherein the comparison information includes comparison in which trade-off information is limited using Pareto optimum solution, the trade-off information between calculation amount of the neural networks and an error on machine learning relating to the neural networks.

2. The information processing method according to claim 1, wherein the comparison information includes comparison using learning curves indicating relationship between the learning results and training time in the neural networks.

3. The information processing method according to claim 1, wherein the error includes at least one of a training error and a validation error.

4. The information processing method according to claim 1, wherein the comparison information of the neural networks designated by a user is presented.

5. The information processing method according to claim 1, further comprising:

causing learning by a plurality of models of neural networks to be executed in parallel.

6. The information processing method according to claim 5, wherein different hyper parameters are respectively set for a plurality of neural networks, and learning is caused to be executed in parallel.

7. The information processing method according to claim 5, wherein the comparison information relating to the plurality of models of neural networks executed in parallel is presented in real time.

8. The information processing method according to claim 1, wherein the neural networks are created by visual programming.

9. The information processing method according to claim 1, wherein downloading of files relating to execution of the neural networks designated by a user is allowed.

10. The information processing method according to claim 9, wherein the files relating to execution of the neural networks include at least one of a network definition file, a parameter file, and a source code.

11. An information processing apparatus comprising:

a control unit configured to acquire learning results by a plurality of models of neural networks and control comparison information relating to the learning results, wherein the control unit presents the comparison information using a graph, and wherein the comparison information includes comparison in which trade-off information is limited using Pareto optimum solution, the trade-off information between calculation amount of the neural networks and an error on machine learning relating to the neural networks.

* * * * *